United States Patent [19]

Barlow et al.

[11] 4,420,261

[45] Dec. 13, 1983

[54] OPTICAL POSITION LOCATION APPARATUS

[75] Inventors: Gordon A. Barlow, Skokie; Timothy T. Tutt; Richard A. Karlin, both of Chicago; John R. Krutsch, Glenview, all of Ill.

[73] Assignee: Lowbar, Inc., Northbrook, Ill.

[21] Appl. No.: 183,357

[22] Filed: Sep. 2, 1980

[51] Int. Cl.³ .................. G01B 11/14; G02B 27/17; G02B 5/00
[52] U.S. Cl. ................................ 356/375; 250/224; 350/171; 350/319
[58] Field of Search .................. 356/51, 372, 375-376, 356/380, 386-387, 398; 250/561, 221-222, 224, 578; 178/18; 340/555-557; 350/171, 319

[56] References Cited

U.S. PATENT DOCUMENTS

| | | | |
|---|---|---|---|
| 2,113,899 | 4/1938 | Oram | 250/224 |
| 3,184,847 | 5/1965 | Rosen | 356/375 |
| 3,816,745 | 6/1974 | Primm et al. | 340/556 |
| 3,819,918 | 6/1974 | Hale | 356/387 |
| 3,841,766 | 10/1974 | Walter | 356/398 |
| 3,898,639 | 8/1975 | Muncheryan | 340/557 |
| 4,198,623 | 4/1980 | Misek et al. | 178/18 |
| 4,267,443 | 5/1981 | Carroll et al. | 250/221 |

FOREIGN PATENT DOCUMENTS

| | | | |
|---|---|---|---|
| 1108327 | 6/1961 | Fed. Rep. of Germany | 250/578 |
| 43-18809 | of 1968 | Japan | 250/221 |

OTHER PUBLICATIONS

Mix, Jr., A. L., "Single Lamp Matrix Illuminator", IBM Tech. Disc. Bull, 9-1969, p. 522.
Bealle, F. J., "Photocell Operational Amplifier with Lenticular Lens", IBM Tech. Disc. Bull, 8-1975, p. 660.

*Primary Examiner*—William H. Punter
*Attorney, Agent, or Firm*—Irwin C. Alter

[57] ABSTRACT

An optical position location apparatus for locating the position of an object in one or more dimensions, which relies upon one or more sources of radiant energy and distributor devices to disburse such radiant energy over a location region or window. Integrated collector assemblies positioned opposite to the distributors receive and collect the transmission of the distributed radiant energy and through reflection or refraction, transfer radiant energy to a minimum of detection locations to monitor the absence or alteration thereof. A rotating optical scanner and a detector are utilized with a continuous stationary light source to successively monitor specific location-coordinate-related portions of transmitted radiant energy and through electronic circuitry, a signal is developed to disclose, with accuracy, the location of objects within the location region "window", as well as other parameters including object size. In other embodiments, an apparatus with elements cooperating along two dimensions is capable of yielding three-dimensional object parameter information.

25 Claims, 13 Drawing Figures

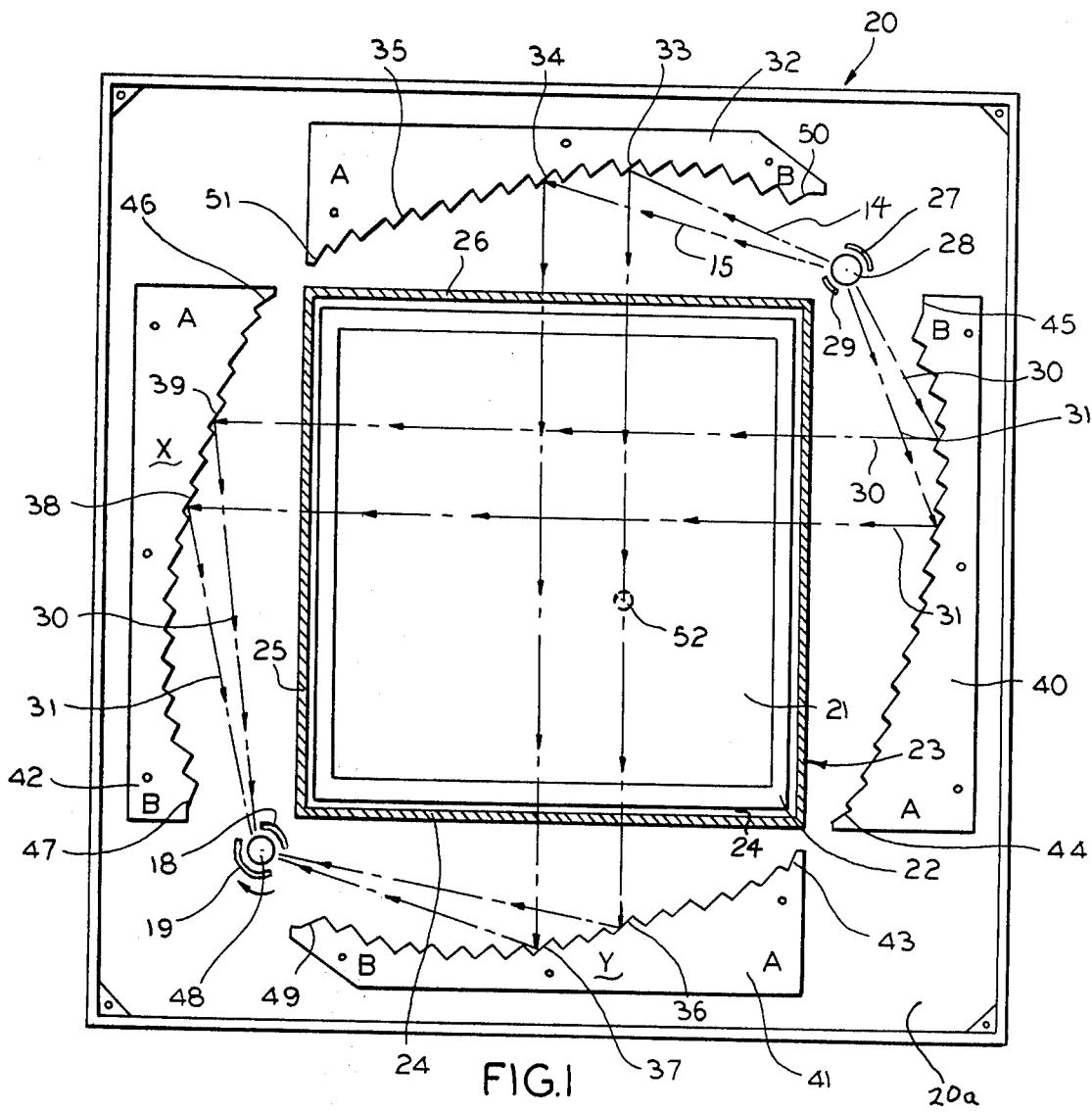
FIG.1
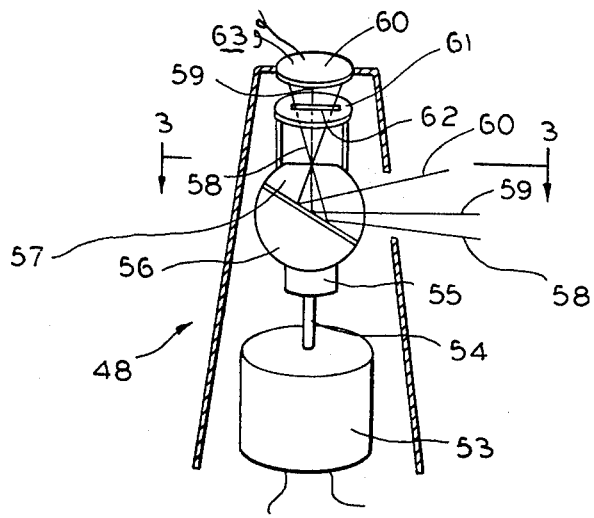
FIG.2
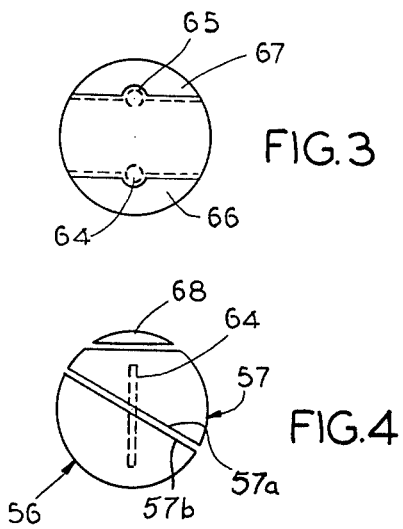
FIG.3
FIG.4

OPTICAL POSITION LOCATION APPARATUS

BACKGROUND OF THE INVENTION

The present invention relates, in general, to electronic sensing equipment and in particular to an optical position location apparatus for locating the position of an object along one or more coordinate axes and for determining other measurable parameters of the object.

There have been several devices in the past which have optically, or through a combination of mechanical and optical devices, had, as a purpose, the location of an object within a one- or two-dimensional frame of reference. Unfortunately, more recent attempts into the field of electro-optical "range finders" and/or "locators" have often been associated with problems which severly limit their effectiveness and use on a large scale. Two such devices are disclosed in U.S. Pat. application Ser. No. 3,184,847 of L. Rosen on a Digital Coordinate Resolver, and in the article *Let Your Fingers do the Talking* in Volume III, No. 8, BYTE Magazine, dated August, 1978, on a non-contact touch scanner.

Among the undesirable aspects of all the prior art, are the substantial costs involved with the unusually large number of components required to construct the devices into even a marginally operative apparatus. Reliance upon literally dozens of light emitting sources with equivalent numbers of "matched" photocell diodes has substantially limited the effectiveness and resolution of prior art optical scanners while, at the same time, requiring substantial expense in terms of costly electronic components which have made uses and applications of the devices impractical.

Other prior attempts have required the attachment of gratings, photocells, or other special paraphernalia to the object being located.

Similarly, the design of most prior art devices often proves to be difficult in terms of compatability with display devices which are capable of otherwise showing the results of the scanning operation. Moreover, where such display devices were utilized, the devices themselves required reinterpretation due to an inflexible, "non-linear" output of such devices.

Some prior art devices have required retroreflectors and, therefore, experience great difficulty locating reflective objects.

Prior art devices all too often relied upon less advanced optical techniques such as the Rosen device above, wherein parabolic mirrors, through their very nature require substantial size parameters. Additionally, great difficulty has been experienced in extending the capabilities of prior art devices beyond one or two dimensions, and few, if any, apparata have been capable of effectively resolving the location and other parameters of an object within a three-dimensional "corridor", or along three or more coordinate axes arranged in two dimensions. Moreover, prior art devices have suffered from limited spacial resolution and low scan rates, and, therefore, limited temporal resolution.

It is thus an object of the present invention to provide a substantially inexpensive optical position locator requiring a minimum of components which is substantially compact and lightweight and which, accordingly, is manufacturable in a facilitated manner in substantial volumes.

It is additionally an object of the present invention to provide such a position locator with substantial spacial and temporal resolution capabilities which is designed to quickly and accurately disclose parameters of an object located within its location region or "window".

It is another object of the present invention to disclose position and other parameters of ordinary untreated objects such as fingers, pens, or pencils.

It is further an object of the present invention to provide such an optical position location apparatus which is compatible with a variety of display outputs and which is capable of disclosing location information for either analysis by a user, or for further input into other systems, in a desirable fashion to avoid complex conversions, such as in linear fashion so as to avoid requiring trignometric conversion programs.

The present apparatus also has, among its objects, the object of providing such an efficient, low-cost, accurate location apparatus which, by its very design, is applicable for use in a myriad of applications ranging from computer information input (as a viable alternative to light pens and keyboards), to toys, automatic industrial machinery controls and any other uses, such as menu picking where expedited automatic determination of object parameters such as location, size and even speed, are required.

It is similarly an object of the present invention to be adaptable to analysis of a three-dimensional "corridor" and the location and other parameters of an object within that three-dimensional space through several different constructions, including the stacking of several two-dimensional units and/or reliance upon radiant energy intensity level analysis in a single two-dimensional unit which is capable of disclosing a third dimension of an object within its location region window. Yet, another embodiment utilizes three-dimensional distributors, collectors and selective viewing scanners.

It is also an object of the present invention to require a minimum of light or radiant energy emission sources and photo-detection devices through the utilization of a single radiant energy source with a novel rotating selective viewing scanner and associated detector which, in combination with novel electronic circuitry and a minimum of electronic components, accurately and quickly disclose the parameter information described above.

Yet, another object is to convert complex motions, such as those of human fingers in motion, into time varying signals to enable a person to so convey vast amounts of complex information to machines or other persons.

Another object is to replace switches.

These and other objects of the invention will become apparent in light of the present specification.

SUMMARY OF THE INVENTION

The present invention comprises an improved optical position location apparatus for locating the position of an object within a location region or "window" along one or more coordinate axes arranged in one or more dimensions and for determining yet other measurable parameters of such a located object such as its size, its opacity, its composition, or its velocity vector.

The apparatus comprises radiant energy emission means, as well as a plurality of distributor means cooperating with the radiant energy emitter which distribute the emitted radiant energy over the location region from a position alongside one portion of this region. One or more integrated collector means correspond to the one or more distributor means, respectively, and are positioned along a section portion of the location region, substantially opposite to the first portion, to cooperate with respective ones of said distributor means. The integrated collector means receive and transfer the radiant energy which successfully traverses the location region, as well as indications of alterations thereto, to detection means, preferably located at a single location to which the transferred radiant energy converges. The apparatus further includes means for selectively viewing location-coordinate-related portions of the radiant energy distributed by the distributor means to detect and disclose properties of radiant energy which have been altered as a result of the object being located at that location coordinate within the location region to, in turn, determine the location of the object within the location region, as well as other parameters of the object.

Distributor means, collector means, and selective viewing means cooperatively ensure that at a given moment, substantially all of the radiation which reaches the detector, in the absence of objects in the location region, traverses the location region in a range about a single location coordinate, such range being at least as small as the smallest object to be located. Moreover, a plurality of distributor means jointly ensure that each portion of the location region large enough to contain the smallest object to be located, will be traversed by at least as many intersecting radiant emission beams as there are coordinate axes.

Accordingly, the present invention distributes radiant energy from a source into a region in an orderly fashion, collects and transfers that energy which traverses that region to a detector, and selectively views location-coordinate-related portions of that radiant-energy—all for the purpose of deducing the location and/or other parameters of one or more objects within that region, from the alterations of the radiant energy traversing that region.

In a preferred embodiment of the invention, the apparatus includes an enclosing housing member in which the radiant emission means or source of radiant energy, the distributor means, the integrated collector means, the selective viewing means, and the detection means are operably and restrainably positioned and sealed. In this embodiment, the location region is described as a substantially apertured area enclosed by the housing member to describe a substantially toroidal housing element.

The apparatus is capable of functioning as a position location apparatus along one or more coordinate axes in from one to three dimensions. That embodiment of the device capable of locating the position of an object in one dimension includes one each of radiant energy emission means, distributor means, integrated collector means, selective viewing means, and detection means.

In that embodiment capable of locating the position of an object along two coordinate axes in two dimensions, the apparatus preferably includes two substantially separate distributor and collector means respectively aligned with one another. In this particular embodiment where two of each said collector means and distributor means are utilized, measuring the intensity of the received radiant energy being transmitted to the detection means, can further be utilized to disclose information relevant to, for example, the height of an object so as to describe information in three dimensions while utilizing distribution collection, and selective viewing means along only two dimensions.

Alternatively, one embodiment of the apparatus is further contemplated to disclose and scan objects in a three-dimensional location region through the utilization of "stacked" two-dimensional locating devices so as to impart location capability along a third coordinate axis throughout a three-dimensional spacial "corridor".

In a preferred embodiment of the invention, the radiant energy emitted by said radiant energy emission means comprises unpolarized electromagnetic light and emission means comprises an incandescent lamp.

In one preferred embodiment, the radiant energy emission means is associated with rotating projecting selective viewing means to transmit a successively moving light beam which is continuously moved along the distributor means then traverses the location region, moving along the location coordinate, and, in turn, moves along the respective collector means as a function of time. In this particular embodiment, also, the detection means comprises a single stationary photosensitive element which cooperates directly with the collector from which radiant energy is directed so as to converge at the photo-sensitive cell. The detection cell cooperates with signal processing means, which as a function of time, discloses altered or blocked light transmissions to, in turn, describe the location of an object within the location range. The radiant emission means can advantageously comprise a laser.

In another embodiment of the invention, the radiant energy source comprises a plurality of individual light sources placed in spaced relationship along the first portion of the location region so as to further, simultaneously, comprise the distributor means. In this particular embodiment, each of the plurality of light sources comprises a light emitting diode, behind a series of baffles and/or other optical elements which create a substantially parallel beam across the location region, to collector means respectively aligned therewith. Further, in this embodiment, the detection means comprises one or two photosensitive elements which cooperate with the collector means aligned opposite to the bank of light emitting diodes. The means by which said detection means selectively views portions of the distributed and received radiant energy emissions, namely, the radiant energy from each of the light emitting diodes is accomplished by pulsating each of the light emitting diodes in sequence, with the detection means element cooperating with signal processing apparata to disclose altered or blocked light transmission properties to, in turn, describe the location or other parameters of an object within the location range.

In a preferred embodiment of the invention, the radiant energy emission means comprises a substantially stationary continuous light source and includes a plurality of shields which intercept and absorb radiation directed to locations other than those along the respective distributor means. In this particular embodiment, the detection means is associated with selective viewing means which comprises a rotating scanner to selectively analyze portions of the continuous radiant energy simultaneously distributed across the location region. The scanner and detector receive radiant energy in either its direct or altered form and, in response thereto, produce an electrical output proportional to the amount of radiant energy being measured, the radiant energy being altered to a differentiable measurable degree by any object blocking the radiant energy being distributed across the location region.

In this preferred embodiment, the associated scanner and detector include shield means to absorb radiant energy not transmitted from the respective integrated collector means to the detector and which serve as points of reference (synchronization indicia) for the signal. The scanner and detector itself comprises a motor operably connected to rotate an optical element. A slotted mask is operably attached to the optical element and rotates simultaneously with it—this slotted mask providing a dimensioned slot to describe the "portion" of transferred radiant energy detected at one instant during the rotation of the scanner-detector, said portion having traversed the location region in a range about a single location coordinate. The scanner-detector further comprises a stationary detector element operably positioned in alignment with the optical element and slotted mask.

The radiant energy is thus transferred from the respective integrated collector means so as to enter the optical element for refraction through the slotted mask and, in turn, to the stationary surface of the detection element, a diode photocell. The rotating optical element and mask permit the scanner assembly to scan, position by position, across one coordinate axis of location range emissions described by a respective integrated collector and to, in turn, scan across the remaining coordinate axes of location range emissions described by remaining collector means in repeatable succession.

The optical element can comprise an optical sphere containing therein a diagonal-cut refraction plane to appropriately refract the radiant energy into and through the slotted mask and, in turn, onto the stationary detector element which, in the preferred embodiment comprises a silicon photocell.

More generally, the optical element can be a bi-radial ellipsoid, with horizontal radius and slot width cooperatively establishing width of view, while vertical radius and slot height cooperatively establish height of view.

While blockage means are used in conjunction with the radiant energy emission means of the embodiment described immediately above, to intercept and absorb radiation directed to locations other than those along the distributor, equivalent blockage means or shields are utilized with the scanner-detector, as previously mentioned, for the three-fold purpose of precluding inadvertent stray radiation from being received by the scanner, providing a position frame of reference whereby different input from different collectors can be segregated and analyzed to determine the dimensional parameters of an object within the location range and providing a black-level reference.

In this preferred embodiment also, the scanner-detector apparatus may be operably coupled, through the signal processing means to visual display means for visual interpretation of radiant energy being scanned and detected thereby.

Further, the motor in this scanner-detector embodiment is coupled via electrical circuitry to the radiant energy emission means together with the detector element and amplifier means. In this circuitry, the motor further includes a capacitor connected in parallel thereto, to reduce commutator noise from the motor and is further connected to resistors to reduce voltage and, in turn, produce a desirable rotational speed in the motor, the temporal resolution being in inverse relationship to the rotational speed. The amplifier is operably connected to the detector element in said scanner-detector.

The amplifier, in this circuitry, responds to the intensity of current released through the detector element, which, preferably, comprises a photo-sensitive diode operating in reverse biased mode. The amplifier itself further includes first voltage gain means with noise suppressant means to transduce the variable current of the photo-sensitive diode into a resulting variable voltage signal. A second voltage gain means is coupled capacitively to the first voltage gain means and is, in turn, connected to a d.c. restorer and to a Schmitt trigger to quantize the resulting signal to one digital bit, thus removing noise. For that embodiment of the invention in which intensity of signal is measured, the Schmitt trigger would be replaced by a buffer amplifier.

Also, a means for visual interpretation of the scanned and detected radiant energy transmitted by the signal processing apparata, comprises a cathode ray visual display apparatus such as an oscilloscope or equivalent.

In one embodiment of the apparatus, the invention further includes radiant energy filter means which are interposed between the distributor means and the collector means for the purpose of substantially removing all radiant energy not having the wavelengths passed by the filter so as to reduce both internal and external stray radiation. In one such embodiment, the filter means comprises an infrared passage filter interposed between the location region and the position location apparatus.

Preferably, the distributor means is capable of distributing radiant energy at positions before and beyond its respective portion of the location range to describe an initial and final radiant energy route which cannot be altered or broken by objects no matter where they may be positioned within the location range. This, in turn, describes reference points to facilitate analysis of detected radiant energy across that portion of the range which is breakable by a located object and to further avoid confusing an object located at the extremes of the location range as being a portion of the shields associated with the scanner-detector.

In the preferred embodiment of the invention, further, the distributor means comprises a stepped echelon mirror assembly for receiving radiation from the radiant energy emission means to, in turn, distribute it across the location region. Similarly, the preferred embodiment of integrated collector means utilizes an equivalent stepped echelon mirror assembly for receiving the radiant energy distributed over the location region and for subsequently transferring it to a substantially single point location at which said detection means is located.

The construction of the distributor or collector, whichever is most adjacent to a rotating scanner, establishes the functional relationship between the location coordinate and the scanner rotation angle. In particular, the distributor or collector (whichever controls said functional relationship) is designed for a substantially linear relationship between position coordinate and scanner rotation angle. The stepped echelon assembly lends itself favorably to the establishment of a variety of arbitrary functional relationships because it allows independent local specification of both mirror position and mirror slope (reflecting angle). For example, a preferred embodiment utilizes a 29 facet stepped echelon assembly as a collector which provides a linear relationship between location coordinates and rotational scan angles, while maintaining light intensity substantially constant. In the 29 facet embodiment facet peaks are spaced 0.2 inches apart and the facets range, in curvilinear fashion, from a depth of 1.617 inches to 0.171 inches.

The construction of both distributor and collector establish the functional relationship between relative intensity of transferred radiation, in the absence of objects, and location coordinate. In particular, it is possible to design the distributor and collector taken as a system to establish a desired relationship between relative intensity and location coordinate. The stepped echelon assembly again lends itself to the establishment of such a relationship because the various reflecting facets can have differing effective reflection areas. The effective reflection area is that area which lies in the desired plane and is not shadowed or obstructed by other portions of the echelon assembly and therefore is effective in transferring radiation to or from the location region. For example, the device may be designed so that each individual facet of the collector will receive a substantially equal amount of radiation generation by the radiant energy emission means and distributed across the location region by the distributor. The width of the largest shadow must be smaller than the width of the smallest object to be located. The stepped mirror assembly can be skewed to substantially eliminate shadows, the facets becoming parallelograms.

For larger location regions, the individual faces of the stepped echelon mirror assemblies may be focusing surfaces shaped so as to maximize radiation transfer.

In alternative embodiments, both the distributor and collector assemblies are non-stepped reflective surfaces such as where both the collector and distributor assemblies are parabolic sections, though size and cost problems may be associated therewith.

In other alternative embodiments, both the distributor and/or the collector assemblies are refractive or a combination of reflective-refractive assemblies. Lenses or prisms would be examples of refractive assemblies, while a combination reflective-refractive assembly would be exemplified by a stepped echelon structure of transparent optic material which has a reflective coating on its rear surface wherein the light is both refracted and reflected.

In the 18 faceted embodiment of stepped echelon mirror, less space requirements exist due to a thinner construction which is traded off against less constant light intensity properties as well the need for trigonometric conversion programming due to its non-linear coordinate versus scan angle relationships. The peaks of this 18 facet embodiment are spaced 0.375 inches apart and range, in curvilinear fashion, from a depth of 1.392 inches to 0.815 inches.

BRIEF DESCRIPTION OF THE DRAWINGS

FIG. 1 of the drawings is a top plan view of a preferred embodiment of the scanner apparatus in which a scanner-detector is utilized together with stepped echelon collectors and distributors for locating an object in a two-dimensional location range;

FIG. 2 is a top perspective view of the scanner-detector device of the embodiment of FIG. 1;

FIG. 3 is a top plan view of the optical element of the scanner-detector;

FIG. 4 is a side elevational view of the optical element of FIG. 3;

DETAILED DESCRIPTION OF THE DRAWINGS

Figure 5:
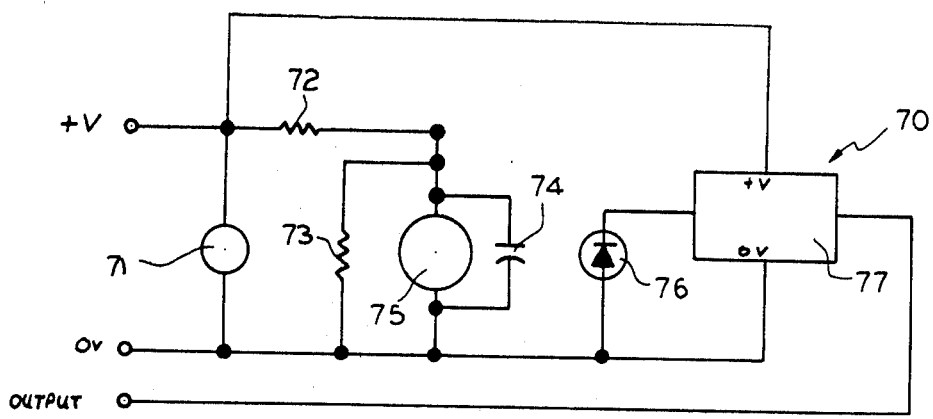
FIG. 5 is a circuit diagram of the components utilized in the scanner embodiment of FIG. 1.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Optical position location apparatus 20 is shown in FIG. 1 as including radiant energy emission source 28, here comprising a continuously radiating stationary incandescent light bulb, with shields 27 and 29 and scanner-detector 48 with shields 18 and 19, all in housing 20a. Shields 27 and 29 preclude the emission of light beams to locations other than those along distributor assemblies 32 and 40.

In this particular preferred embodiment, distributor assembly 32 comprises a series of mirrored surfaces forming a stepped echelon such as mirrored surfaces 33, 34 and 35, capable of reflecting the diverging light beams from light source 28 into a substantially parallel light beam pattern across location region 21. Both collectors 41 and 42 are specifically designed to enable detector-scanner 48 to rotate a substantially equivalent radial scan angle to monitor a respective equivalent linear distance across location region 21. Accordingly, when detector-scanner 48 is rotating, an equivalent angle of rotation allows the scanner-detector to monitor an equivalent portion of the location region "window" 21 regardless of the path a particular light beam follows in being reflected to cross the window. This particular construction linearizes the output display location coordinate as a function of radial scan angle and, therefore, as a function of time in the devices shown in FIGS. 7 through 10.

It should be noted that mirrored surfaces on distributors 32 and 40, are provided at locations 50 and 51 at assembly ends B and A, respectively; and 45 and 44 on assembly 40, in order to transmit and distribute radiant energy beams across portions of the "window" preceding and subsequent to the actual location region in which an object can move. Transmission of light from bulb 28 to location 44 at end A of distributor 40 transmits a beam across the actual edge 24 of red and infrared passage filter 23, which is substantially collected and received by mirrored surface 47 for reflection to scanner-detector 48. Since no object can occupy a position outside of window 21 to interfere with the beam thusly transmitted, the signal created by an object within the location region, as displayed in FIG. 8, cannot merge with the displayed representation of the shields so that an object's blocking of light rays is still separated by spacing, though minimal, such as that shown at space 124 in FIG. 8.

Figure 8:
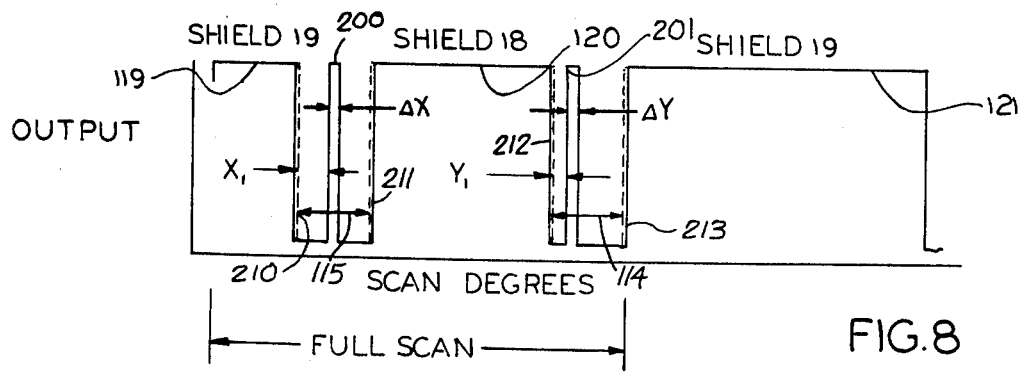
FIG. 8 is a schematic view of output display in which an object is located within the location range.

Apparatus 20 discloses the specific embodiment of scanner apparatus for locating and measuring an object's parameters in two dimensions wherein the two distributors, 32 and 40, are arranged opposite to collectors 41 and 42, respectively. Since light source 28 is a stationary continuous source of electromagnetic radiant energy, a continuous beam pattern is generated, as exemplified by beams 30 and 31 along the X-coordinate and beams 14 and 15 being distributed from distributor 32 to collector 41 in the Y-coordinate. Accordingly, the existence of an object such as object 52 (shown in phantom) would block or otherwise alter radiant energy beam 14 as it is reflected from mirrored surface 33 to mirrored surface 36. Accordingly, when scanner-detector 48 rotates to review that portion of radiant energy which would otherwise be reflected from mirror surface 36, the output display, as shown in FIG. 8, would show object 52 a distance of Y1 relative to the radial time distance from shield 18.

While the arrangement of distributors and collectors in the embodiment of FIG. 1 are substantially orthogonal, the apparatus could equivalently utilize non-orthogonal or angled scanning beam patterns. Red and infrared passage filter 23 is utilized to pass only the red and infrared wavelengths across the position location range and also to exclude all non-red or non-infrared stray radiation from entering from outside the apparatus so that such stray light cannot upset the operation of the apparatus, and for sealing and enclosing the substantially toroidal housing. Other radiant energy filter means may equivalently be utilized including an all-pass (clear) window. Additionally, non-stepped mirror assemblies may be utilized although they may require substantially deep curvilinear mirror forms which greatly enlarge the size and costs associated with the device—problems which are overcome by the specially designed stepped echelon mirrors. Each of the respective stepped echelon mirrors, whether used as a distributor or collector, has at its large end A and small end B, respectively, mirrored surfaces which permit reflection and transfer of radiant energy outside the "blockable" portions of the location region window 21. Alternatively, refracting means such as lenses or Fresnel type lenses or refracting-reflecting means such as a mirrored prism, may be used in place of distributors 32 and 40 and/or collectors 41 and 42, to transfer diverging light from light source 28 through refraction and/or refraction-reflection into substantially parallel beams across window 21 or, alternatively, to detection means.

Optical scanner 48 is shown in FIG. 2 as comprising motor 53 with axle 54 connected to optical element 56-57 through attachment member 55. Attached for rotation to optical member 56-57 is mask-baffle 61 with apertured slot 62 which permits transmission of analyzed light "portions" to impinge upon detector 60 with electrical leads 63.

Scanner 48 as shown in FIGS. 1 and 2, rotates to receive radiant energy transmissions from collectors such as collector 41, though only a portion of the transmitted beams are permitted to reach detector 60, preferably a silicon photocell diode, as limited by slotted aperture 62. In rotating at a constant speed, reflections from collector 41 are first reviewed by the detector as it rotates clockwise, then, absence of light is displayed as a result of the scanner viewing shield 19. This is followed by the scanner reviewing reflections from collector bank 42 followed by the absence of light due to shield 18, and so on. Preferably, shields 18 and 19 are black and opaque to more effectively absorb unwanted radiation. Silicon photocell 60 is maintained in a stationary position above rotating mask 61.

Optical element 56-57 comprises an optically transparent sphere, here acrylic, cut into two hemispheres. The lower hemisphere 56 is utilized solely as a balance to facilitate even rotation of the optical device by motor 53 and shaft 54. Hemisphere 57 has back planar surface 57a which is, preferably, optically polished. The outwardly exposed surface of hemisphere 57, which is shown in FIG. 2 receiving radiant energy beams 58 through 60, acts as a converging lens surface. Total internal refraction takes place at surface 57b due to the nominal index of refraction of the material used (acrylic having an index of 1.5) as opposed to the 1.0 index of the air space maintained by spacer pins 64 and 65, located at the back planar surface 57a.

The optical device is shown in FIG. 3 before top section 68, as shown in FIG. 4, has been removed, and through FIGS. 3 and 4, the construction for the optical device which includes spacer pins 64 and 65 and hemisphere portions 56 and 57 are shown. Spherical sections 66 and 67 are opaqued. Alternatively, they may be cut away and the surfaces so exposed may then be opaqued.

In the preferred embodiment of the scanner-detector, Acrylite 210-0 or Plexiglas 2423 are used in forming the red and infrared pass filter 23, sealing off the interior of the "donut-shaped" apparatus assembly. A three-quarter inch diameter acrylic sphere will serve for the optical element 56-57, although glass can equivalently be used. The width of slot 62 is 0.014 inches. With the front "converging lens" width of hemisphere 57 approximating 0.3 inches, an approximately 0.3 inch wide beam of light from the filament of lamp 28 (G.E. No. 194) traverses the location region and passes through slot 62 onto photo detector 60 which must be spectrally compatible with radiant source 28. In the preferred embodiment, photo detector 60 comprises silicon photodiode VACTEC VTS-4085H.

In circuit arrangement 70 of FIG. 5, input power applied to +V and OV is at 12 volts d.c. at nominal 0.35 amps, regulated to 5 percent. Lamp 71 is directly connected across the 12 volts. Motor 75 is paralleled by capacitor 74 for noise suppression. Preferably, this capacitor should be a wide band RF bypass type such as a 0.1 to 0.01 microfarad metallized polyester capacitor. Resistors 72 and 73 reduce the 12 volts d.c. to a nominal positive 5.7 volts d.c. to produce the desired rotational speed in motor 75. This speed is high enough for the desired scanning rate, yet low enough for good motor life and ease in data processing. A wide range of rotational speeds could be produced by using an appropriate d.c. or a.c. motor driven by an appropriate d.c. or a.c. voltage source. In some applications, a synchronous motor is preferred, and for others, a stepping motor is preferred. The former assures a constant scanning rate; the latter, quantizes the location range without the need for software calculations. An appropriate d.c. motor for use in the preferred embodiment of FIG. 1 would be a MABUCHI RF-510T-12620 with a nominal rotation speed of 2400 r.p.m. Photocell sensor 76 is operatively connected to amplifier assembly 77.

Figure 6:
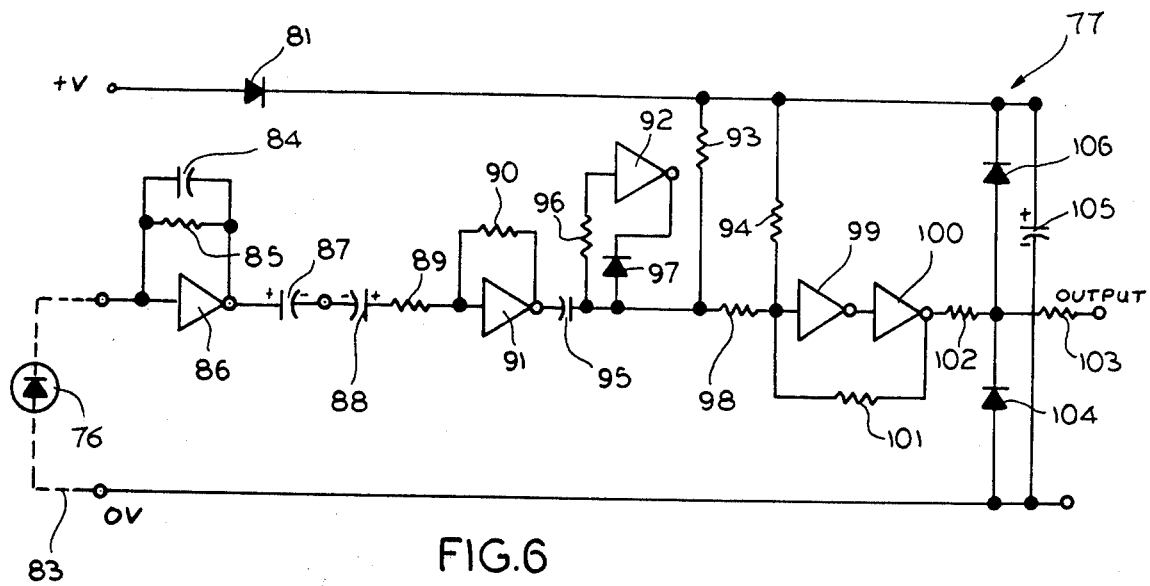
FIG. 6 is a circuit diagram of the amplifier circuit of FIG. 5.

Amplifier 77 is shown in FIG. 6 as including five separate sections of a CMOS 74C04 hex-invertor. Pin 7 of the 74C04 connects to the OV rail and pin 14 of the 74C04 connects to the positive rail at the cathode of diode 81, thus applying 12 volts less one diode drop to the 74C04 and thereby establishing Vcc at approximately 11.3 volts. Alternatively, operational amps 86, 91, 92, 99 and 100, with appropriate circuit modifications each comprise a Texas Instruments TL081, a section of Texas Instruments TL084 or a National Semiconductor LM308 amplifier. The first portion of amplifier 77 is a voltage gain stage where 2.2 megohm resistor 85 sets the input current to output voltage gain. A 10 picofarad capacitor 84 rolls off the high frequencies to reduce noise. Resistor 85 also maintains photocell reverse bias voltage. The output of this stage is coupled by back-to-back, polarized 10 microfarad capacitors 87–88 or alternatively by a 10 microfarad non-polarized capacitor, to second stage input resistor 89. Second operational amplifier 91 is connected to one megohm feedback resistor 90, and with 100 kilohm resistor 89, it yields a nominal voltage gain of 10. This output is coupled through capacitor 95 of 0.1 microfarad to 10 kilohm resistor 96, op amp 92 and diode 97, (1N914). Op amp 92 and diode 97 act to clamp the signal so that it cannot go positive of the bias point of the amplifier (nominal ½ Vcc). The 470 kilohm resistor 93 holds the output of the capacitor 95 against the clamp level. Elements 92, 93, 96, and 97 constitute a d.c. restorer. The d.c. restored signal (where the most positive d.c. level is ½ Vcc) is coupled to a Schmitt trigger 98–101. Op amps 99 and 100 are coupled in the Schmitt trigger to 4.7 megohm feedback resistor 101 and 220 kilohm input resistor 98. 1.5 megohm resistor 94 biases the Schmitt trigger point referred to the input of resistor 98 to slightly negative of the d.c. base line set by the d.c. restorer. Resistor 101 sets the hysteresis along with the 220 kilohm resistor 98 which also affects the input sensitivity. The two 470 ohm resistors, 102 and 103, together with diodes 104 and 106 (1N914) protect the output against static electric discharges or other accidental stress. A 10 microfarad electrolytic capacitor 105 serves as a power supply filter.

Diode 81 protects against damage due to accidental polarity reversal, and can further serve as a rectifier for embodiments using a.c. applied power.

In the circuit arrangement of FIG. 6, photocell 76 acts as a current source which is light controlled.

Figure 7:
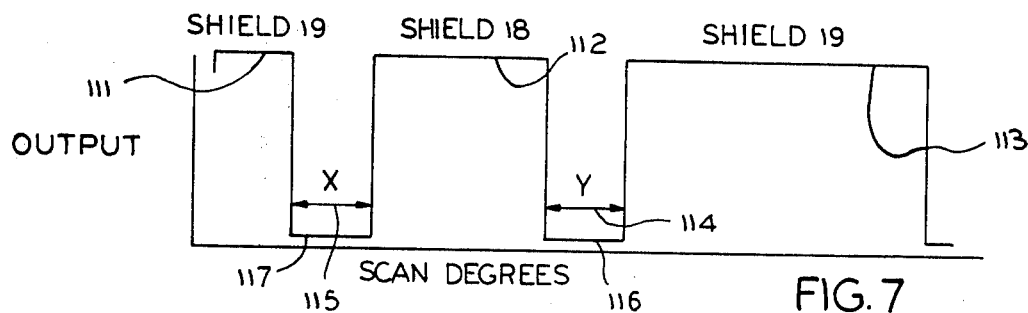
FIG. 7 is a schematic view of output display in which the location region is empty or unobstructed.

In operation, when the scanner-detector 48 of FIG. 1 is facing or focusing upon shields 18 and 19, the d.c. restorer clamps the signal to ½ Vcc. This is the plus-most input to the Schmitt trigger portion of the circuit. The bias resistor 94 of 1.5 megohms, causes the Schmitt trigger to have a net plus input under this condition, and the output is, therefore, near the +12 volt rail (maximum output) of FIG. 7. When the scanner looks across the unimpeded range at a view or reflection of lamp 28, the signal level at the photocell swings relatively negative. The output proximate to capacitors 87 and 88 goes relatively positive and the output at capacitor 95 goes relatively negative. The output after the d.c. restorer therefore swings negative of the nominal Vcc restorer level. The net input to the Schmitt trigger 98–101 goes negative of the lower trigger level, and the final output goes to the zero volt rail (minimum voltage value-base position) of output as shown in FIG. 7. Should an object such as object 52 appear which absorbs or blocks radiation for part of the scan as shown in FIG. 1, where radiation beam 14 would be blocked, then for that portion of the scan, the output of the photocell returns to its "dark" level (no current), the output out of the first gain stage goes relatively negative, the second gain stage output goes relatively positive and the signal restorer returns to the ½ Vcc base line as shown in FIG. 7 with the output going to its first logic position (maximum output position) as shown by outputs 200, 201 in FIG. 8.

Accordingly, FIG. 7 of the drawings displays the positions of shields 18 and 19 when no object is interferring with the distribution of radiant energy across the location region. Shield portion 113 and 111 in FIG. 7 are merely continuations of the same substantially large shield 19 while signal representation 112 displays the logic one display (maximum output position) of smaller shield 18 about scanner-detector 48. The position along the X- or Y-coordinate axis when an object does register, by altering the light input to photocell 60 is shown by the variable X (115), and variable Y (114), respectively.

FIG. 8 depicts a typical output waveform of the device when an object is located within the location region window 21, such as object 52 shown in FIG. 1. Logic one level outputs 119 through 121 correspond to the light blockage resulting from shields 18 and 19 as described above. Additional logic one level outputs 200 and 201 are shown located within the X and Y scan regions 115, 116, respectively. These outputs correspond to the light blockage resulting from an object located within the location region window 21.

Because of the relationship between the scanner rotational angle and the range position along the X and Y coordinate axes, it is possible to deduce from the location and the width of such logic one level outputs 200 and 201 the location and size of the interferring object 52 within the location window 21. Specifically, the offset of the rising edge of output 200 from the zero or beginning point of the X scan 115, which offset distance is designated as X1 in FIG. 8, corresponds to the location of the nearest edge of interferring object 52 to the zero axis point along the X axis of the location region window 21. Hence, by knowing the functional relationship between the scan angle in degrees represented by this offset X1 and the corresponding linear displacement along the X axis of the location region window 21, the actual location of object 52 may be determined. In a similar fashion, the location of object 52 along the Y axis may be deduced from the offset Y1 of the rising edge of signal 201 from the zero or null position of Y scan 114.

Additional information may be obtained from the output waveform as shown in FIG. 8 relating to the size of interferring object 52 relative to the X and Y axes. Specifically, the width of signal 200, shown as delta X in FIG. 8, corresponds to the width of object 52 relative to the X axis. Similarly, the width of signal 201, delta Y, corresponds to the size of object 52 relative to the Y axis. Hence, by knowing the relationship between the angular displacement represented by delta X and delta Y and the corresponding linear displacement along the X and Y axes, the size of the object 52 may be determined.

FIG. 8 further depicts offset region 210 located between the falling edge of output 119 and the depicted beginning point of X scan 115. Simiarly, offset region 211 is shown between the end point of X scan 115 and the rising edge of signal 120, with offset region 212 located between the falling edge of signal 120 and the beginning point of Y scan 114. Finally, offset region 213 is shown between the end point of Y scan 114 and the rising edge of signal 121.

These offset regions 210 through 213 correspond to uninterruptable light signals which are transmitted external to the location region window 21, such as along its immediate external periphery, from the light source 28 to the scanner-detector 48. The existence of these light signals results in a fixed duration logic zero output just prior to and just following the X and Y scan. These signals may thus be utilized to provide calibration of the detection and/or interpretation circuitry, such as to define the existence and exact size of the X and Y scans 115, 116. it should be noted that, although such non-interruptable signals are provided for the beginning and ending points of both the X and Y scans in the embodiment whose output is shown by FIG. 8, other embodiments may utilize fewer than all of these possible calibration signals as desired.

Figure 9:
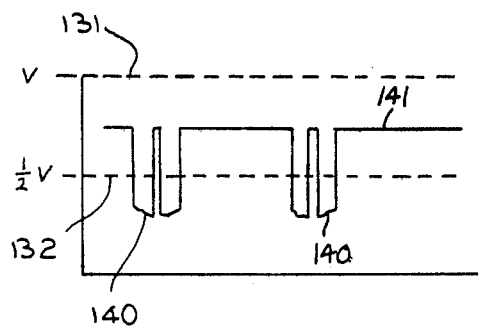
FIG. 9 is a schematic view of output display showing the output signal before the d.c. restorer portion of circuitry is incorporated.

FIG. 9 of the drawings depicts the relative voltage levels existent in a typical output signal prior to operation of the d.c. restorer portion of the circuit. Specifically, the logic one output level 141 is shown as being less than the supply voltage, V (131), and greater than one-half of the supply voltage, ½ V (132). The logic zero level 140 is shown as being greater than zero volts but less than one-half of the supply voltage, ½ V (132). In this manner, the signal can be seen to "straddle" the one-half supply voltage level.

Figure 10:
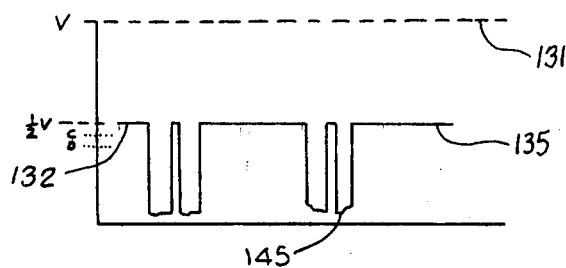
FIG. 10 is a schematic view of output display after the d.c. restorer portion of the circuit is utilized.

After operation of the d.c. restorer circuit, the logic zero level 145 of the resulting waveform is near to the zero voltage reference, as depicted in FIG. 10. In addition, the resulting logic one level 135 is substantially equal to one-half of the supply voltage, ½ V (132).

This resulting signal is then amenable to processing by the Schmitt trigger portion of the circuit as previously described. Depicted on FIG. 10 are the relative voltage levels levels C and D relating to the break points of a typical Schmitt trigger stage. As can be seen, this resulting waveform is readily amenable to processing by such Schmitt trigger devices in order to accurately indicate the transition points relating the desired position data.

Figure 11:
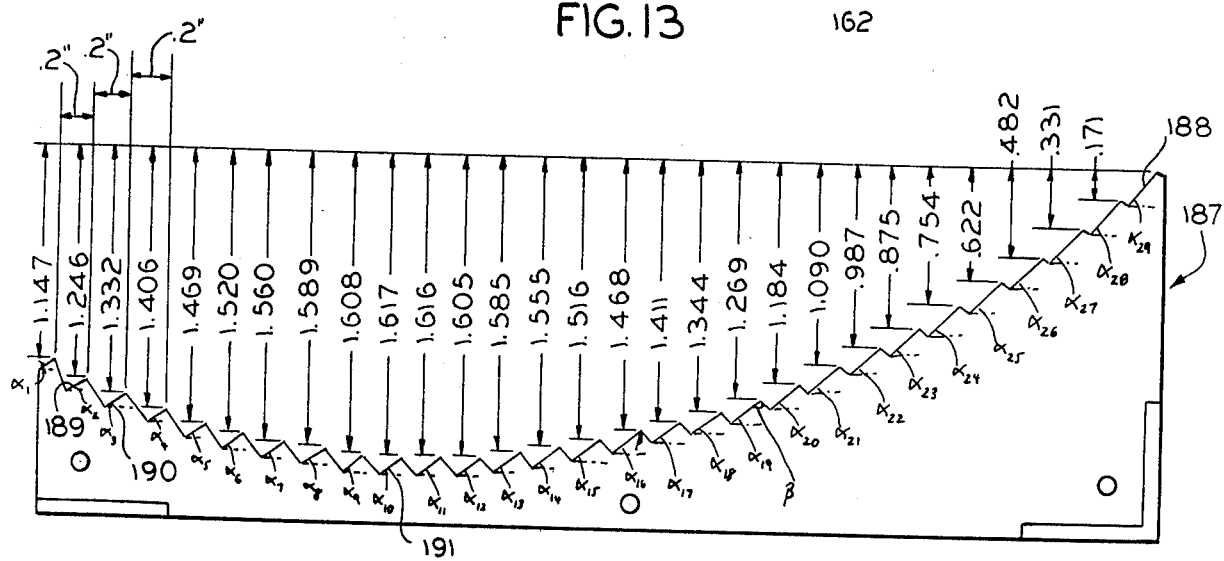
FIG. 11 is a top plan view of one embodiment of stepped echelon mirror assembly.

FIG. 11 shows the specially designed 29 facet stepped echelon mirror assembly in which the peaks of the mirrors are a constant dimension from one another in succession, here 0.2 inches.

In the embodiment of FIG. 11, the following angular relationships exist:

| All beta angles = 90 degrees | | | | | | | | |
|---|---|---|---|---|---|---|---|---|
| alpha | deg. | min. | alpha | deg. | min. | alpha | deg. | min. |
| 1. | 27 | 15 | 11. | 34 | 10 | 21. | 41 | 10 |
| 2. | 28 | 00 | 12. | 34 | 55 | 22. | 41 | 50 |
| 3. | 28 | 40 | 13. | 35 | 35 | 23. | 42 | 30 |
| 4. | 29 | 20 | 14. | 36 | 20 | 24. | 43 | 15 |
| 5. | 30 | 00 | 15. | 37 | 00 | 25. | 43 | 55 |
| 6. | 30 | 45 | 16. | 37 | 40 | 26. | 44 | 35 |
| 7. | 31 | 25 | 17. | 38 | 20 | 27. | 45 | 20 |
| 8. | 32 | 05 | 18. | 39 | 05 | 28. | 46 | 00 |
| 9. | 32 | 50 | 19. | 39 | 45 | 29. | 46 | 40 |
| 10. | 33 | 30 | 20. | 40 | 25 | | | |

Figure 12:
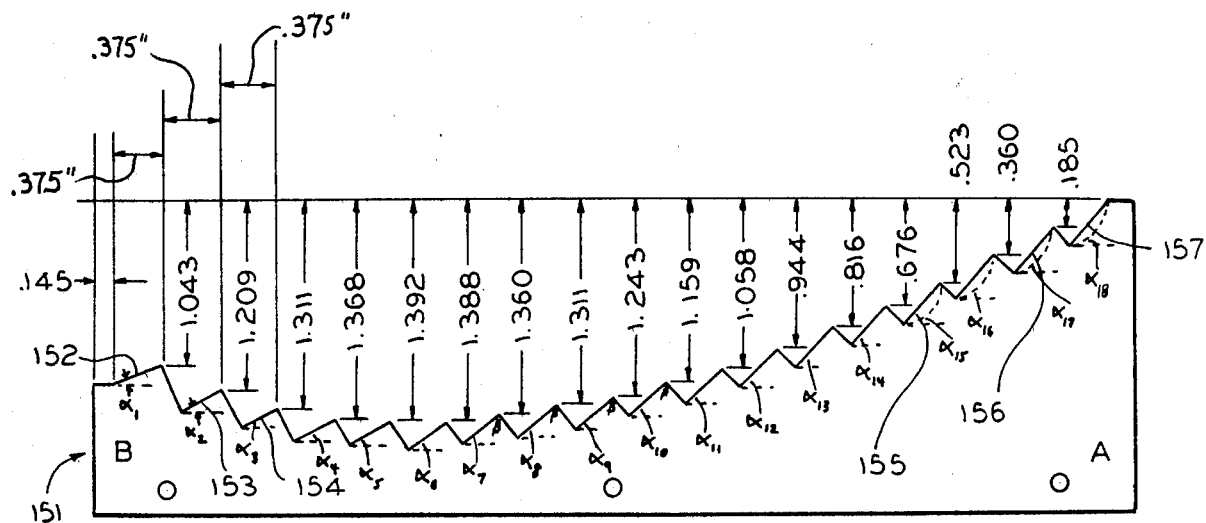
FIG. 12 is a second embodiment of stepped echelon mirror assembly.

In FIG. 12 of the drawings, an 18 facet stepped echelon mirror is shown in which peaks are spaced 0.375 inches apart. In FIG. 12, the angles are as follows:

| All beta angles = 90 degrees | | | | | | | | |
|---|---|---|---|---|---|---|---|---|
| alpha | deg. | min. | alpha | deg. | min. | alpha | deg. | min. |
| 1. | 16 | 56 | 7. | 32 | 44 | 13. | 40 | 34 |
| 2. | 20 | 56 | 8. | 34 | 20 | 14. | 41 | 34 |
| 3. | 24 | 05 | 9. | 35 | 47 | 15. | 42 | 30 |
| 4. | 26 | 42 | 10. | 37 | 08 | 16. | 43 | 23 |
| 5. | 28 | 58 | 11. | 38 | 22 | 17. | 44 | 12 |
| 6. | 30 | 57 | 12. | 39 | 30 | 18. | 45 | 00 |

It should be realized that facets such as 191 in FIG. 11 or 155 and 156 in FIG. 12 can be substantially planar in form or curved as shown in phantom, so as to "focus" the light reflected thereby. Additionally, the number of surfaces being utilized in a particular application can be optimized relative to produceability, economics, edge losses, resolution and echelon assembly depth. However, the particular design of FIG. 11 makes possible a linear output display due to the capability of the detector-scanner to "review" or focus upon respective equivalent distances across the location region window as a function of respective substantially equivalent radial scan angles. Thus, the incremental differences in angular position of the scanner when in optical alignment with peaks of successive mirror facets will be substantially equal, corresponding to equal incremental angular separation between the facets. Because the peaks of the facets are also equally spaced along the coordinate axis as previously discussed, a direct linear relationship between displacement along the coordinate axis and the angular position of the scanner results.

The particular construction of this stepped echelon mirror assembly also makes possible the control of intensity so that intensity is substantially equivalent across the window 21 regardless of the coordinate position being reviewed. In terms of resolution, it is necessary to develop pitch spacing between the facets of a particular mirror assembly which is smaller than the smallest object desired to be resolved. Alternatively, the mirror facets can be skewed to parallelogram form to eliminate shadows. For shallower mirrors than that of FIG. 11, such as FIG. 12, a trignometric or other function must be used in conjunction with the display device since the location of an object will now be a non-linear function of the radial scan angles at which the object is detected.

In another embodiment of the invention, optical element 57 is stationary facing toward shield 29 and shield 18 is removed. Mask 61 is not required. Detector 60 is Fairchild Semiconductor CCD110 'Linear Image Sensor' or equivalent, and in combination with appropriate circuitry and element 57 constitutes both selective viewing means and detection means.

In another embodiment of the invention, the means for selectively viewing portions of transferred radiant energy occurs at other locations along the radiant energy transmission path. For example, instead of utilizing a rotating "scanner-detector", as previously described, a stationary detector may be utilized with a projecting-scanner-emitter. Referring to FIG. 2, in the scanner-emitter embodiment, former photocell 60 becomes light-source 60, with elements 61, 62 and 53 through 57 assuming the same structures as previously described.

Scanner-emitter 48 would replace scanner-detector (48) between banks 41 and 42 to transmit radiant energy across "window" 21 in a direction opposite to the arrow heads shown in FIG. 1. Transmissions and/or alterations in the energy thus transmitted are picked up by stationary photocell assembly 28 within shields 27 and 29. In this embodiment, the collector assemblies become distributor assemblies and vice versa.

Alternatively, electrochemical, electromechanical, mechanical, or electronic shutter means such as liquid crystal display elements or aperture slots moved by loud speaker, solenoid, or piezo-electric ceramic transducers, may be interposed at appropriate positions along the radiant energy transmission path, to enable selective viewing of the transmitted radiant energy emissions.

Figure 13:
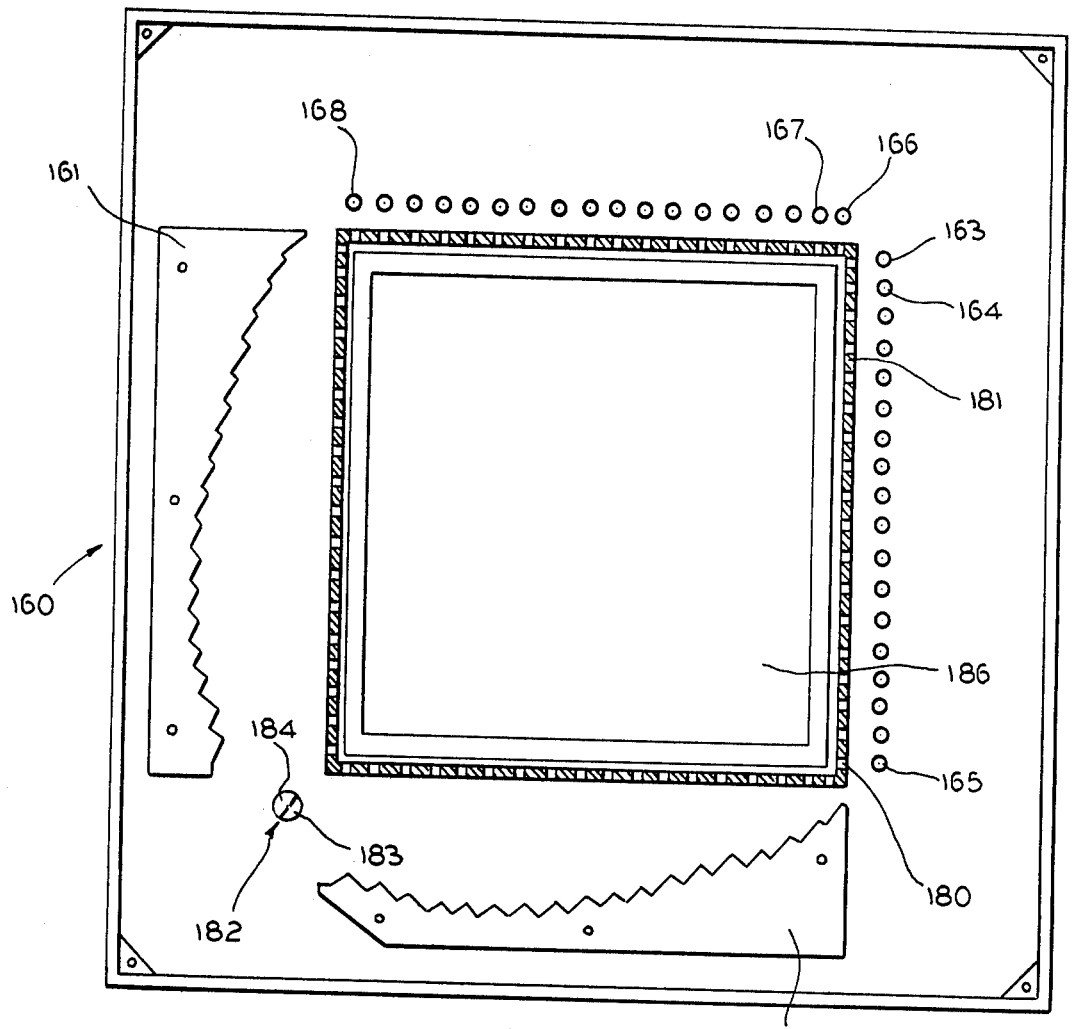
FIG. 13 is a top plan view of an alternative embodiment of optical scanner apparatus in which integrated collector means are utilized with a plurality of light emitting sources which serve simultaneously as distributor means.

FIG. 13 represents yet another embodiment of the present apparatus wherein a plurality of light emitting diodes are provided which function as both the radiant energy emission means and the distributor means. Specifically, a multiplicity of light emitting diodes are arranged along each of two of the axes of the location region window 186 such that the radiant energy output of the devices is transmitted in substantially parallel beams across the location window 186. These diodes are represented in FIG. 13 by, for example, LED 163, 164, 165, 166, 167, and 168. The beams so generated may be further columnated by utilization of picket frame 181, containing a plurality of apertures 180. Integrated collector banks 161 and 162 serve to equivalently reflect transmitted light, (or the absences thereof) to detection device 182 which consists of back-to-back photocells 183 and 184. Picket frames 181, which could be macro or micro louvers and which completely encircle the location region 186, serve to restrict the emitted light into parallel beams.

In order to selectively view or scan portions of the radiant energy and to establish a frame of reference relative to which one of the LED beams is being blocked, should an object appear within window 186, the LEDS themselves are pulsed in successive order at a desired rate to create a scan-time signal similar to that of the embodiment of FIG. 1. Through such a technique, only one or two photocell devices are required to "interpret" the transmission and alteration characteristics resulting from the location of an object within location region 186.

The foregoing description and drawings merely explain and illustrate the invention; and the invention is not limited thereto, except insofar as the appended claims are so limited, as those skilled in the art who have the disclosure before them will be able to make modifications and variations therein without departing from the scope of the invention.

What is claimed is:

1. An optical position location and size determining apparatus for locating the positions of one or more objects along one or more coordinate axes of a defined sensing area, as well as for determining other measurable parameters of said one or more objects such as the sizes thereof relative to said one or more coordinate axes, said apparatus comprising:
   radiant energy emission means;
   radiant energy detection means;
   means for distributing said radiant energy emitted by said radiant energy emission means over a location region from a position proximate to a first side of said region;
   one or more integrated collector means proximate to a second side of said location region, said integrated collector means cooperating with said distributor means to receive said radiant energy distributed by said distributor means and to transmit said radiant energy to said radiant energy detection means;
   signal output means operably connected to said radiant energy detection means;
   shield means, said shield means to prevent ambient or stray radiant energy not transmitted from said integrated collector means from impinging said radiant energy detection means;
   scanner means;
   said scanner means including optical element means, said optical element means operating to direct said radiant energy received from said integrated collector means to said radiant energy detection means;
   said scanner means further including motor means, said motor means being operably connected to said optical element means whereby said optical element means is made to rotate with respect to said integrated collector means;
   said scanner means further including apertured mask means, said apertured mask means having a dimensioned aperture therein;
   said apertured mask means cooperating with said optical element means and located in optical alignment with said optical element means and said radiant energy detection means;
   said shield means and said scanner means cooperating to restrict the radiant energy received by said radiant energy detection means to that portion of said distributed radiant energy received by the portion of said integrated collector means which is instantaneously in optical alignment with the combination of said rotating optical element means, said dimensioned aperture of said apertured mask means, and said radiant energy detection means, whereby the radiant energy received by said integrated collector means may be sequentially and selectively monitored by said radiant energy detection means.

2. The invention according to claim 1 wherein said radiant energy emission means, said distributor means, said integrated collector means, and said radiant energy detection means are operably positioned within an enclosed housing member,
   said location region comprising a substantially apertured area enclosed by said housing member.

3. The invention according to claim 1 wherein the apparatus includes one said radiant energy emission means, one said distributor means, one said integrated collector means, and radiant energy detection means for determining the location and/or other parameters of one or more objects along one coordinate axis.

4. The invention according to claim 1 wherein said apparatus includes two substantially separate distributor means, two substantially separate integrated collector means respectively aligned with said two distributor means, and radiant energy detection means for determining the location and/or other parameters of one or more objects along two coordinate axes.

5. The invention according to claim 1 wherein said radiant energy comprises unpolarized electromagnetic light.

6. The invention according to claim 1 wherein said radiant energy emission means comprises substantially stationary continuously emitting light source means.

7. The invention according to claim 1 wherein said optical element means comprises a sphere having fabricated therein a substantially diagonal-cut plane portion for refraction of radiant energy into and through said dimensioned aperture of said apertured mask means.

8. The invention according to claim 1 wherein said radiant energy detection means comprises photocell means.

9. The invention according to claim 1 wherein said radiant energy emission means includes blockage means to intercept and absorb radiation directed to locations other than those occupied by said distributor means.

10. The invention according to claim 1 wherein said motor means is coupled to said radiant energy emission means, to said radiant energy detection means, and to amplifier means in an electrical circuit, said motor means further including electrical filter means in parallel connection therewith to reduce commutator noise from said motor means;

said motor means further including speed control means to produce a desired rotational speed in said motor means, said motor means further being connection in parallel connection to said amplifier means, which is, in turn, operably connected to said radiant energy detection means to receive signals therefrom.

11. The invention according to claim 1 wherein said radiant energy detection means is operably coupled via signal processing means to visual display means for visual interpretation of the radiant energy being scanned and detected by said radiant energy detection means cooperating with said scanner means.

12. The invention according to claim 1 wherein said apparatus further comprises radiation filter means interposed between said distributor means and said integrated collector means for the purpose of precluding interference from light and other radiant energies of wavelengths other than those of the intended radiant energy being emitted, distributed and collected for detection.

13. The invention according to claim 12 wherein said filter means comprises a red-and-infrared passage filter interposed between said distributor means and said integrated collector means.

14. The invention according to claim 1 wherein said distributor means distributes radiant energy at positions outside of said location region so as to describe radiant energy routes which cannot be altered or broken by objects located within said location region, the radiant energy traversing the resulting unalterable radiant energy transmission routes and detected by said radiant energy detection means thereby creating reference signals defining fixed and known positions relative to said location region.

15. The invention according to claim 1 wherein one or more of said one or more distributor means comprises a stepped echelon mirror assembly, said stepped echelon mirror assembly comprising a plurality of faceted mirror elements;

said faceted mirror elements being individually oriented with respect to said radiant energy emission means and said location region to receive a portion of the radiant energy emitted by said radiant energy emission means and thereafter transmit it across a select portion of said location region.

16. The invention according to claim 1 wherein said radiant energy detection means comprises solid state photo detector means.

17. The invention according to claim 15 wherein said faceted mirror elements are oriented with respect to said radiant energy emission means and said location region such that the radiant energy emitted by said radiant energy emission means is transmitted across said location region in substantially parallel beams spaced substantially evenly across said location region.

18. The invention according to claim 17 wherein each of said faceted mirror elements receives a substantially equal portion of radiant energy from said radiant energy emission means.

19. The invention according to claim 1 wherein or or more of said one or more integrated collector means comprises a stepped echelon mirror assembly;

said stepped echelon mirror assembly comprising a plurality of faceted mirror elements;

said faceted mirror elements being individually oriented with respect to said location region and said radiant energy detection means to receive radiant energy from a select portion of said location region and thereafter transmit it to said radiant energy detection means.

20. The invention according to claim 15 wherein one or more of said faceted mirror elements include curved mirror surfaces for providing reflective focusing of the radiant energy.

21. The invention according to claim 19 wherein said faceted mirror elements are oriented with respect to said location region and said radiant energy detection means such that said faceted mirror elements individually receive radiant energy from portions of said location region which are substantially parallel to one another and which are spaced substantially evenly across said location region.

22. The invention according to claim 21 wherein each of said faceted mirror elements is within optical alignment with said optical element means of said scanner means for substantially equal portions of the rotation of said rotating scanner means, and wherein the incremental angular separation between the peaks of each of each said faceted mirror elements corresponds to substantially equal angular portions of the rotation of said rotating scanner means, whereby a substantially linear relationship exists between the instantaneous angular position of the optical elements means of the rotating scanner means, and the transverse location of that select portion of said location region from which radiant energy is being instantaneously received by said radiant energy detection means via said stepped echelon mirror assembly.

23. The invention according to claim 22 wherein said stepped echelon mirror assembly comprises 29 substantially individual faceted mirror elements;

each of said 29 faceted mirror elements being 0.2 inches wide with respect to a datum line defining a linear axis; and said faceted mirror elements ranging in depth relative to a datum line parallel to said linear axis and contiguous to the outermost edge of the outermost extending faceted mirror element a distance ranging from 1.617 inches to 0.171 inches, in substantially curvilinear fashion.

24. The invention according to claim 1 wherein said signal output means comprises:

detector buffer means, said detector buffer means responding to the electrical output signal of said radiant energy detection means and generating a corresponding buffer output signal;

output discriminator means, said output discriminator means connected to the output of said detector buffer means whereby said buffer output signal maybe analyzed to determine whether said buffer output signal corresponds to the presence or absence of an object within that relevant portion of said location region which corresponds to that portion of said integrated collector means which is instantaneously in optical alignment with said scanner means and said radiant energy detection means;

said output discriminator means generating a first given output signal when said buffer output signal corresponds to the absence of an object within said relevant portion of said location region; and said output discriminator means generating a second given output substantially distinct from said first given output signal when said buffer output signal corresponds to the presence of an object within said relevant portion of said location region.

25. The invention according to claim 24 wherein said detector buffer means comprises:
  amplifier means;

said amplifier means generating said buffer output signal, said buffer output signal thereby generated comprising a first variable voltage output signal;

said amplifier means including gain determining means;

said amplifier means further including electrical filter means for supressing input signals of undesired extraneous frequencies;

said output discriminator means comprising d.c. restorer means, said d.c. restorer means designed to add or subtract a given voltage to said first variable voltage output signal;

said output discriminator means further comprising Schmitt trigger means for outputting a first logic one level output when said d.c. variable voltage second output signal rises above a first predetermined voltage level, and outputting a second logic zero level output when said second variable output signal falls below a second predetermined voltage level.

* * * * *

UNITED STATES PATENT AND TRADEMARK OFFICE
CERTIFICATE OF CORRECTION

PATENT NO. : 4,420,261
DATED : December 13, 1983
INVENTOR(S) : GORDON A. BARLOW; TIMOTHY T. TUTT; RICHARD A KAR-
LIN; JOHN R. KRUTSCH It is certified that error appears in the above-identified patent and that said Letters Patent are hereby corrected as shown below:

Col. 1, lines 16/17:   "severly" should be --severely--;

Col. 2, line 68:       "section" should be --second--;

Col. 5, line 46:       "inadvertant" should be --inadvertent--;

Col. 12, line 64:      "Simiarly" should be --Similarly--;

Col. 13, line 39:      "levels levels" should be --levels--;

Col. 18, line 37:      "of each of each" should be --of each--.

Signed and Sealed this

Seventeenth Day of July 1984

[SEAL]

Attest:

GERALD J. MOSSINGHOFF

Attesting Officer

Commissioner of Patents and Trademarks